(12) United States Patent
Yeom

(10) Patent No.: US 8,780,889 B2
(45) Date of Patent: Jul. 15, 2014

(54) IP CONVERGED SYSTEM AND CALL PROCESSING METHOD THEREOF

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1038 days.

(21) Appl. No.: 12/321,432

(22) Filed: Jan. 21, 2009

(65) Prior Publication Data

US 2009/0185558 A1    Jul. 23, 2009

(30) Foreign Application Priority Data

Jan. 22, 2008  (KR) ................ 10-2008-0006760

(51) Int. Cl.
*H04L 12/66* (2006.01)

(52) U.S. Cl.
USPC .......... 370/352; 370/230; 370/232; 370/234; 370/354; 379/221.01; 379/221.03

(58) Field of Classification Search
CPC ............ H04L 12/5691; H04L 12/5692; H04L 12/5693; H04L 12/5694; H04L 12/95; H04L 12/96; H04L 2012/64; H04L 12/64; H04L 65/102; H04L 29/06179; H04L 12/6418; H04L 47/15; H04L 47/801; H04L 47/805; H04L 2012/647

USPC .............. 370/230, 232, 235, 235.1, 237, 252, 370/253, 254, 256; 379/220.01, 221.01, 379/221.02, 221.03, 221.04, 221.07
See application file for complete search history.

(56) References Cited

U.S. PATENT DOCUMENTS

| | | | |
|---|---|---|---|
| 7,391,762 B2 * | 6/2008 | Ko ............................... 370/352 |
| 7,636,429 B2 * | 12/2009 | Kwak ...................... 379/207.06 |
| 8,160,058 B2 * | 4/2012 | Cho ............................. 370/352 |
| 2003/0059005 A1 * | 3/2003 | Meyerson et al. ......... 379/88.17 |
| 2006/0140174 A1 * | 6/2006 | Yeom ........................... 370/352 |
| 2006/0268848 A1 * | 11/2006 | Larsson et al. ............... 370/356 |
| 2007/0070907 A1 * | 3/2007 | Kumar et al. ................ 370/235 |
| 2007/0140113 A1 * | 6/2007 | Gemelos ...................... 370/229 |
| 2010/0220742 A1 * | 9/2010 | Brewer et al. ................ 370/412 |
| 2011/0200034 A1 * | 8/2011 | Delveaux et al. ............ 370/352 |

* cited by examiner

Primary Examiner — Awet Haile

(57) ABSTRACT

A call processing method in an Internet Protocol (IP) converged system includes: requesting an incoming call to be routed through an IP network; checking a data traffic-processing state of a traffic manager in response to the request; and rerouting the call through the IP network or rerouting the call through a Public Switched Telephone Network (PSTN) according to the checked data traffic-processing state.

20 Claims, 6 Drawing Sheets

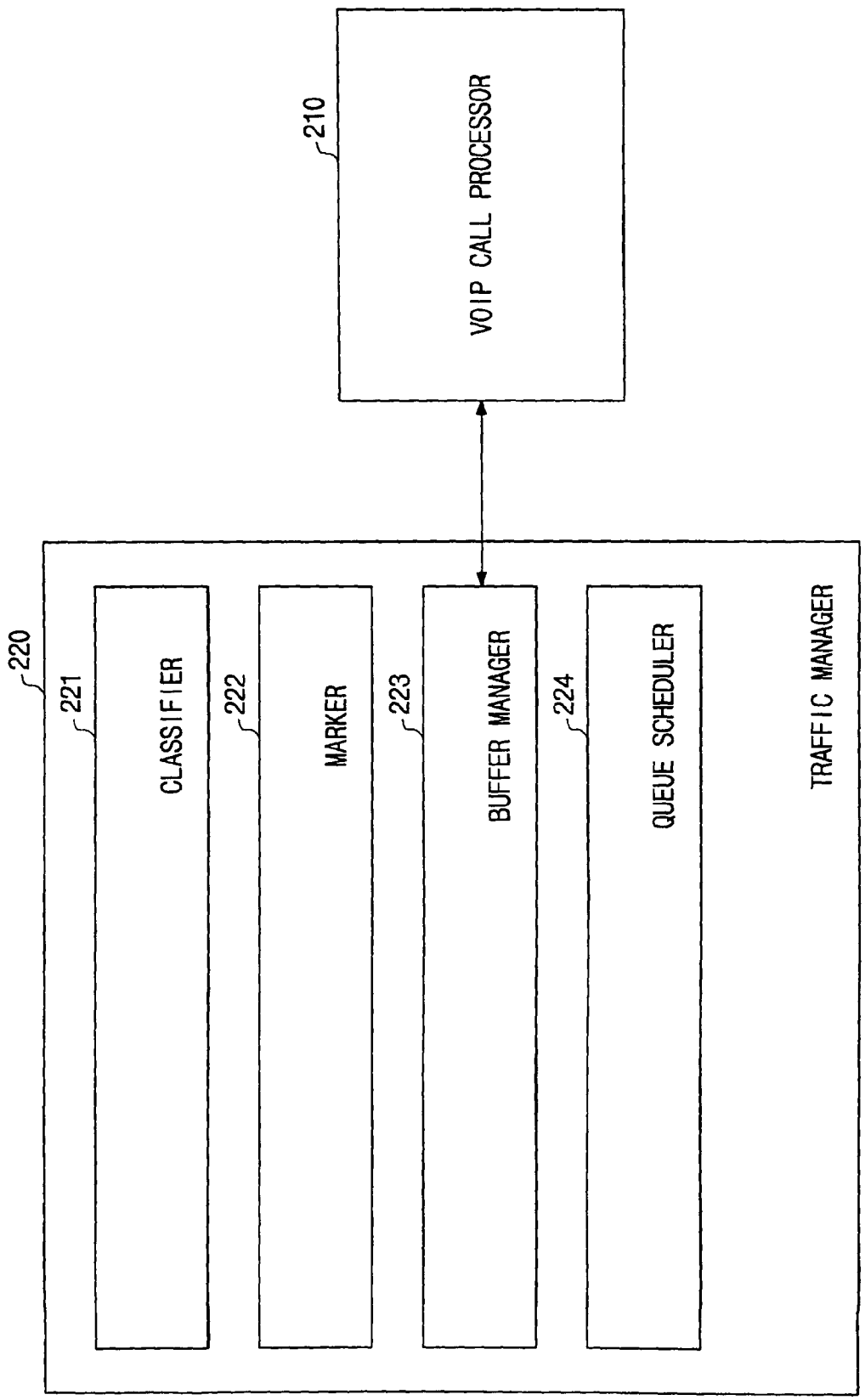

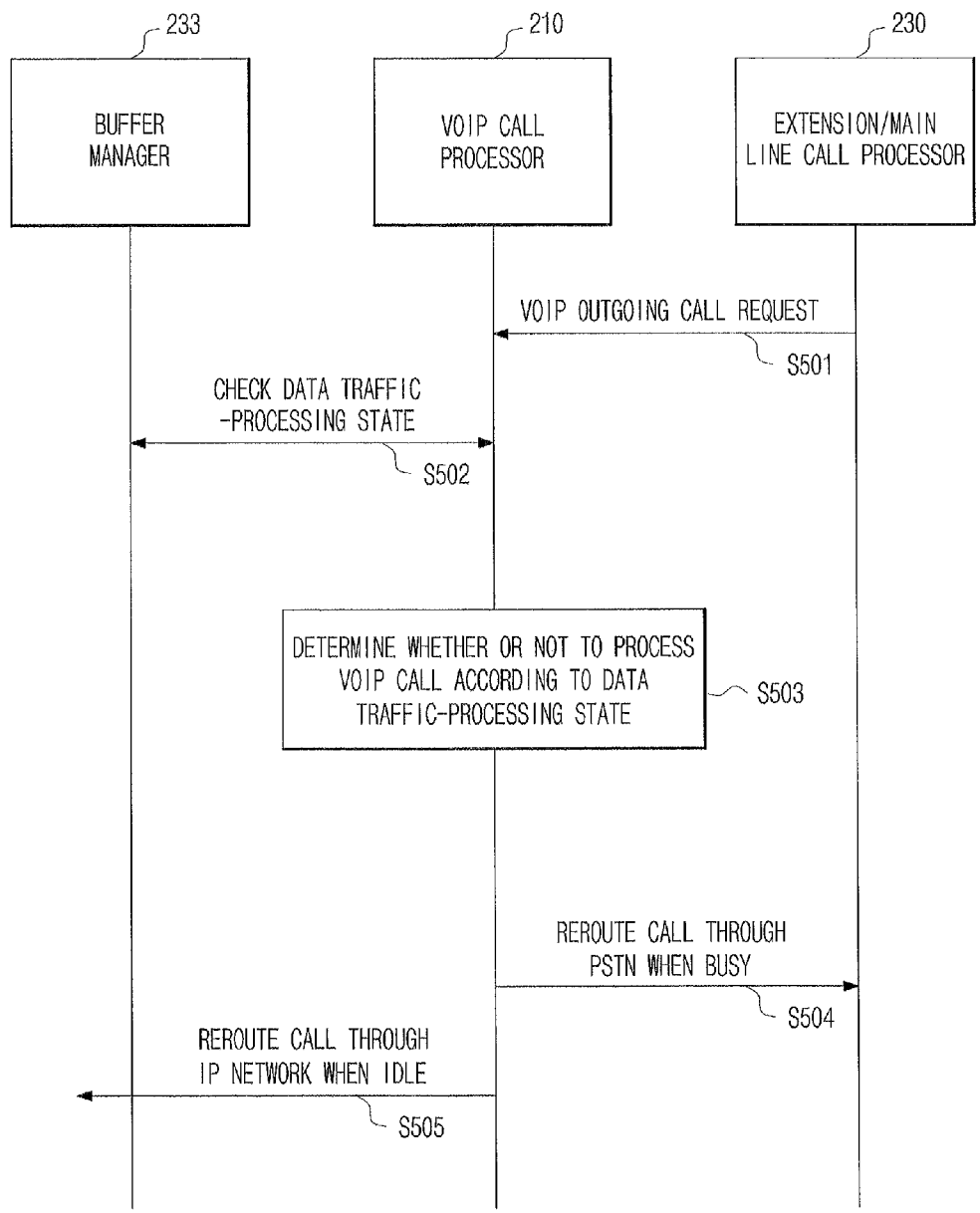

IP CONVERGED SYSTEM AND CALL PROCESSING METHOD THEREOF

CROSS-REFERENCE TO RELATED APPLICATION(S) AND CLAIM OF PRIORITY

The present application claims priority from and the benefit of Korean Patent Application No. 10-2008-006760, filed on Jan. 22, 2008, which hereby incorporated by reference for all purposes as if fully set forth herein.

TECHNICAL FIELD OF THE INVENTION

The present invention relates to an Internet Protocol (IP) converged system and a call processing method thereof and, more particularly, to an IP converged system processing both voice and data, which processes call routing according to data traffic-processing state, and a call processing method thereof.

BACKGROUND OF THE INVENTION

Recently, the conventional Public Switched Telephone Network (PSTN) is coexisting with the current IP network, the demand of which is rapidly increasing. Thus, the converged IP network is gaining attention as a next generation network since it is an IP network that can converge voice traffic, which is being serviced on the existing PSTN. The converged IP network converges different types of traffic such as data traffic, voice traffic and multimedia traffic on the IP network. In this case, the IP converged system processes the data, voice and multimedia traffics by converging these traffics on the IP network.

FIG. 1 is a configuration view illustrating the construction of an integrated IP network.

The integrated IP network includes a PSTN 110, an IP network 120 and IP converged systems 130*a* and 130*b*.

The PSTN 110 routes calls to a number of subscribers by processing voice traffic.

The IP network 120 processes VoIP data traffic and common data traffic.

The IP converged systems 130*a* and 130*b* process both voice traffic and data traffic and can be simultaneously connected to both the PSTN 110 and the IP network 120. Examples of the IP converged systems 130*a* and 130*b* may include an IP-Private Branch exchange (IP-PBX), an Integrated Access Device (IAD), a home gateway, a Wireless Broadband Customer Premises Equipment (WiBro CPE) and so on.

Random Early Drop (RED) is a method of controlling network congestion, which randomly drops packets before congestion occurs. For this, the RED drops the packets by setting two thresholds including minimum and maximum thresholds to a queue and applying different packet drop probabilities to three sections. In detail, the RED operates as follows:

When an average queue size is smaller than the minimum threshold, all packets are allowed to pass through (No drop).

When the queue size is the same as or greater than the minimum threshold but smaller than the maximum threshold, packets are randomly dropped according to packet drop probabilities based on the queue size (Random drop).

When the queue size is the same as or greater than maximum threshold, all input packets are dropped (Tail drop).

As the number of packets stacked in the queue is increasing, the RED decreases the amount of incoming traffic by dropping more packets. When the maximum threshold is set too small, a severe effect on the entire performance can be caused due to frequent packet drops. Furthermore, an operation of dropping all incoming packets if the queue size is the same or greater than the maximum threshold is the same as the result caused by a buffer overflow. Hence, the RED generally sets the maximum threshold to be the same as or similar to the maximum size of the queue.

When packet drop probability is too low, packet drop frequency decreases and thus congestion control becomes difficult. Therefore, it is most important for the RED to properly set the minimum threshold, the maximum threshold and the packet drop probability.

However, since the RED randomly drops packets, even a high precedence packet can be dropped when the queue is full. The Weighted RED (WRED) was proposed to compensate for such drawbacks of the RED.

The WRED is designed to reduce the loss of important packets by weighting packet drop probabilities. Specifically, the WRED sets minimum and maximum thresholds and maximum drop probabilities to be different according to corresponding classes of traffics.

As described above, the IP converged systems 130*a* and 130*b* can be connected to both the PSTN 110 and the IP network 120. Thus, the IP converged systems 130*a* and 130*b* route an incoming call through the PSTN 110 or through the IP network 120.

Call routing in the network is enabled via the Least Cost Routing (LSR) so that least cost can be consumed. Generally, the IP network 120 is cheaper than the PSTN 110. Thus, the IP converged systems 130*a* and 130*b* generally route an incoming call through the IP network 120, but reroute the call through the PSTN 110 in an exceptional case.

The IP converged systems 130*a* and 130*b* reroute a call through the PSTN 110 based on a predetermined condition. The condition is, for example, the number of connecting VoIP calls and whether or not the link of the IP network 120 is down. For example, the condition of rerouting a call through the PSTN 110 may be the case when the number of connecting VoIP calls is one hundred (100). When one hundred (100) calls are being connected to the IP network 120, the IP converged systems 130*a* and 130*b* route other calls through the PSTN 120.

Conventionally, calls are rerouted through the PSTN when the link of the IP network is down or according to the number of concurrent calls. In this case, the IP converged systems 130*a* and 103*b* reroute a call irrespective of whether the processing state of common data traffic is idle or busy (congestion). In other words, the IP converged systems 130*a* and 130*b* reroute a call irrespective of the data traffic-processing state that has a direct effect on sound quality. The poor sound quality fails to ensure Quality of Service (QoS) and thus the IP converged system cannot ensure efficient use of resources.

SUMMARY OF THE INVENTION

To address the above-discussed deficiencies of the prior art, it is a primary object to provide an IP converged system and a call processing method thereof, which can ensure the Quality of Service (QoS) of a call by checking data processing state through interworking between a VoIP call processor and a buffer manager and efficiently routing the call based on the checking result.

Embodiments of the invention also provide an IP converged system and a call processing method thereof, which can ensure seamless call routing to users irrespective of the congestion of IP data traffic by efficiently utilizing the resources of the IP converged system.

According to an aspect of the invention, the IP converged system may include a traffic manager interworking with a Voice over Internet Protocol (VoIP) call processor and processing data traffic by allowing a packet to pass through or drop the packet; and the VoIP call processor checking a data traffic-processing state of the traffic manager to route an incoming call through an IP network or reroute the incoming call through a Public Switched Telephone Network (PSTN) based on the checked data traffic-processing state.

In an exemplary embodiment, the traffic manager may process data traffic according to a Weighed Random Early Drop (WRED) algorithm.

In another exemplary embodiment, the traffic manager may set a minimum threshold, a maximum threshold and maximum packet drop probability to be different according to traffic.

In a further exemplary embodiment, the VoIP call processor may compare a queue size of a buffer in the traffic manager with a minimum threshold set according to traffic, and determine the data traffic-processing state to be idle when the queue size of the buffer is greater than the minimum threshold but to be busy when the queue size of the buffer is equal to or smaller than the minimum threshold.

In another exemplary embodiment, the VoIP call processor may reroute the call through the PSTN when the data traffic-processing state is busy.

In a further exemplary embodiment, the VoIP call processor may route the call through the IP network when the data traffic-processing state is idle.

In further another exemplary embodiment, the IP converged system may further include an extension/office line call processor routing the call through the PSTN when the VoIP call processor reroutes the call through PSTN; and a media gateway processing transcoding between media for processing the call.

According to another aspect of the invention, the call processing method in an IP converged system may include steps of: requesting an incoming call to be routed through an IP network; checking a data traffic-processing state of a traffic manager in response to the requesting; and rerouting the call through the IP network or rerouting the call through a Public Switched Telephone Network (PSTN) according to the checked data traffic-processing state.

In an exemplary embodiment, data traffic may be processed using a Weighed Random Early Drop (WRED) algorithm.

In another exemplary embodiment, drop precedence level may be set according to traffic by setting a minimum threshold, a maximum threshold and packet drop probability to be different according to the traffic.

In a further exemplary embodiment, a lower precedence packet may be set with lower drop precedence so as to be dropped earlier, and a higher precedence packet may be set with higher drop precedence so as to be dropped later.

In another exemplary embodiment, a queue size of a buffer in the traffic manager may be compared with a minimum threshold set according to traffic, and the data traffic-processing state may be determined to be idle when the queue size of the buffer is less than the minimum threshold but to be busy when the queue size of the buffer is equal to or greater than the minimum threshold.

In a further exemplary embodiment, the call is rerouted through the PSTN when the data traffic-processing state is busy.

In further another exemplary embodiment, the call may be rerouted through the IP network when the data traffic-processing state is idle.

As set forth above, the invention can ensure the QoS of sound quality by estimating expected sound quality of a VoIP call according to the data traffic-processing state of the buffer manager and providing efficient routing based on the estimation. Furthermore, the invention can provide a seamless call service irrespective of the congestion of IP data traffic to users by efficiently utilizing the resources of the IP converged system through optimum routing.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a block diagram illustrating the detailed construction of a traffic manager of the IP converged system according to the invention;

FIG. 5 is a ladder diagram illustrating a call-processing process in which a VoIP call processor, a buffer manager and an extension/main line call processor interwork with each other according to the invention.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter an IP converged system and a call processing method thereof according to the invention will be described more fully with reference to the accompanying drawings.

Figure 1:
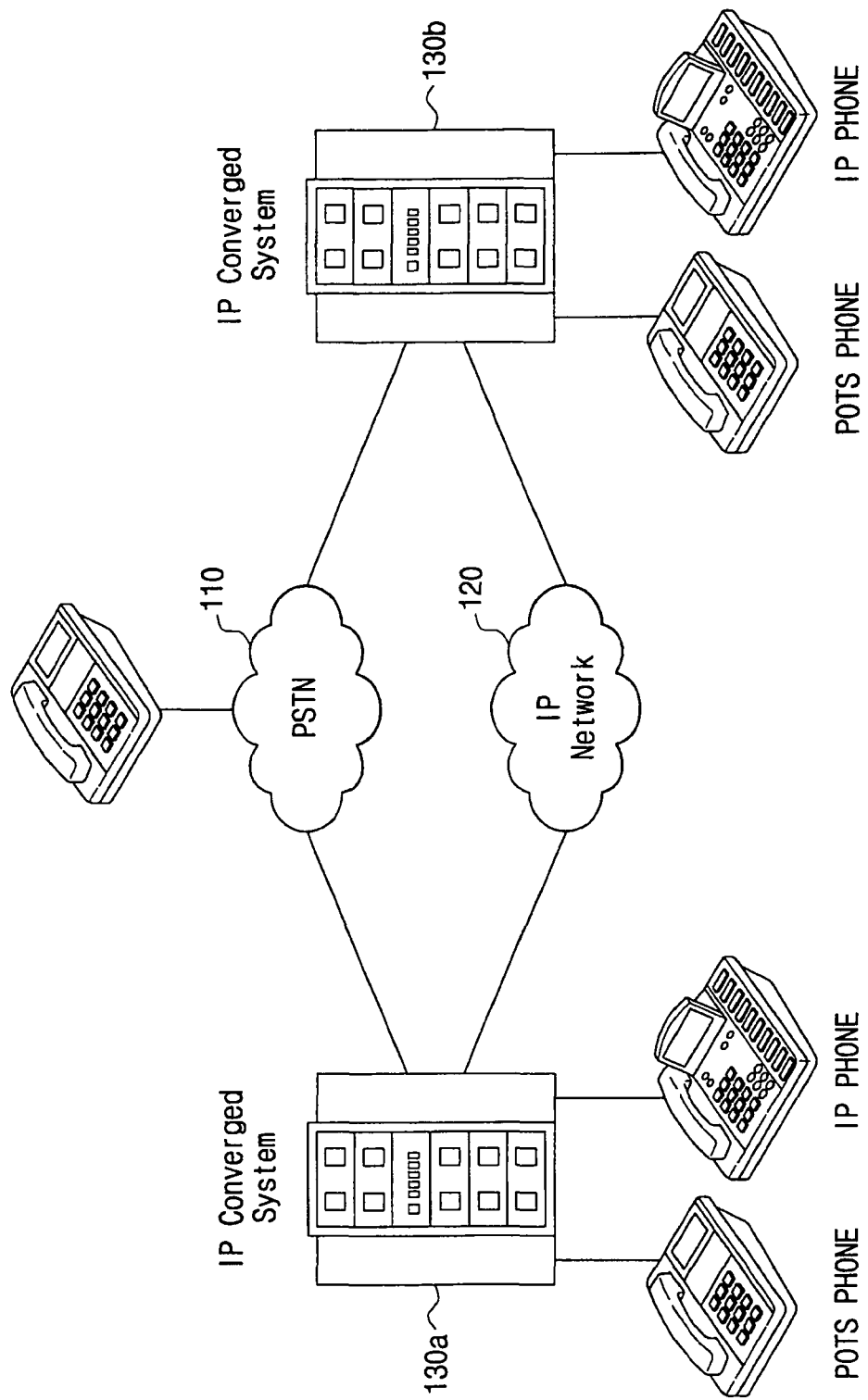
FIG. 1 is a configuration view illustrating the construction of an integrated IP network.
Figure 2:
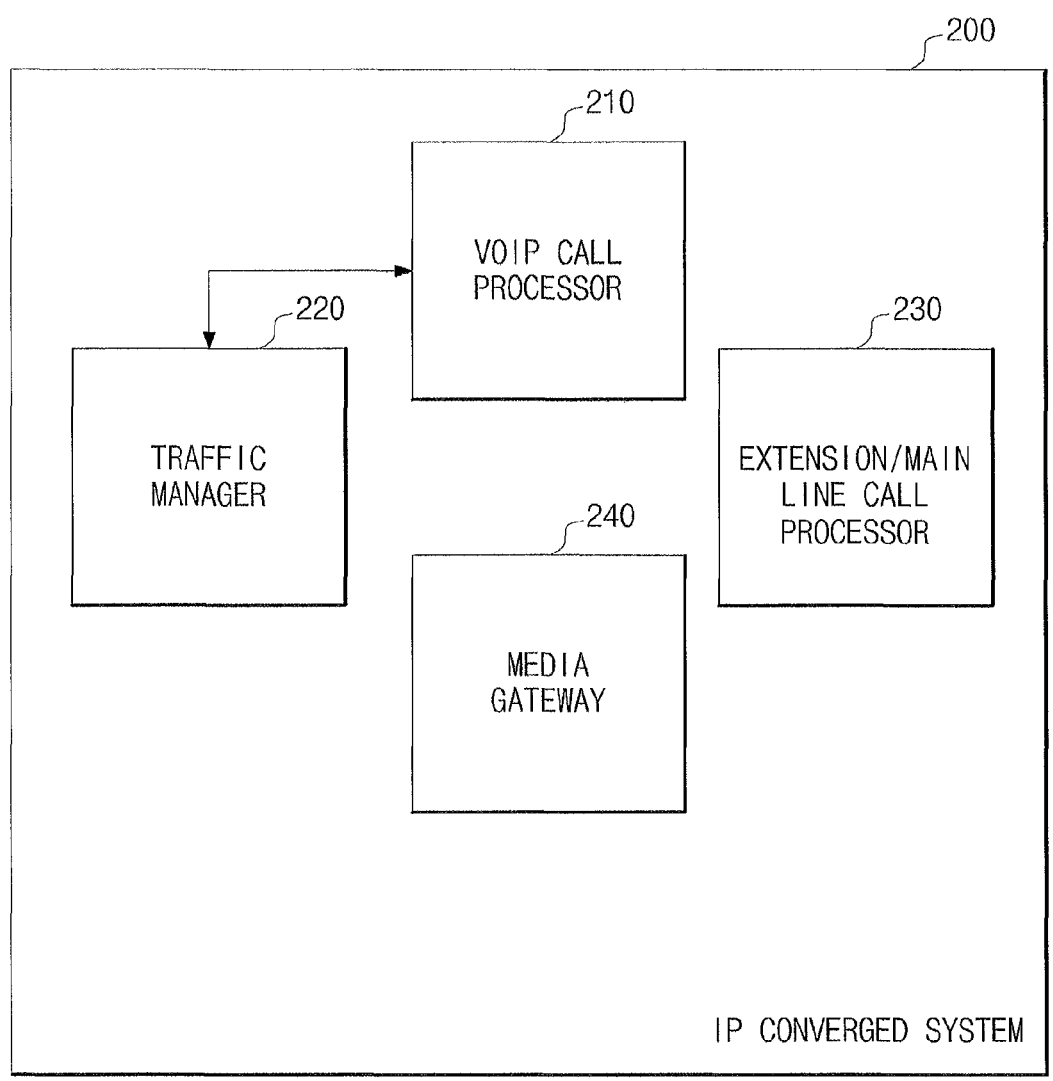
FIG. 2 is a block diagram illustrating the construction of an IP converged system according to the invention.

FIG. 2 is a block diagram illustrating the construction of an IP converged system 200 according to the invention.

The IP converged system 200 serves as an access gateway, which can be simultaneously connected to both a PSTN and an IP network. The IP converged system 200 includes a VoIP call processor 210, a traffic manager 220, an extension/main line call processor 230 and a media gateway 240.

The VoIP call processor 210 routes an incoming call through the IP network or reroutes the call through the PSTN according to data traffic-processing state. For this, the VoIP call processor 210 herein interworks with the traffic manager 220, which will be described later.

When routing calls, the VoIP call processor 210 determines whether the data traffic-processing state is busy or idle by checking the state of the traffic manager 220. Specifically, the VoIP call processor 210 can determine whether the data traffic-processing state is busy or idle by comparing the queue size of a buffer in a buffer manager 233 of the traffic manager 220, which will be described later, with a minimum threshold set to a type of traffic.

When the data traffic-processing state is busy, the QoS of a VoIP call is not ensured because of busy data traffic. Therefore, when the processing state is busy, the VoIP call processor 210 reroutes the call through the PSTN.

In contrast, in the idle state, the VoIP call processor 210 routes the call through the IP network. In this case, the VoIP call processor 210 processes a signal for setting and canceling the VoIP call.

The traffic manager 220 includes a classifier 221, a marker 222, the buffer manager 223 and a queue scheduler 224. Details on the construction of the traffic manager 220 will be described later with reference to FIG. 3. Here, the VoIP call processor 210 interworks with the buffer manager 223.

The traffic manager 220 manages data traffic and, particularly, processes the data traffic using a Weighted Random Early Drop (WRED) algorithm to control network congestion. The process in which the traffic manager 220 processes the data traffic using the WRED algorithm will be described later with reference to FIGS. 4A and 4B.

When the VoIP call processor 210 reroutes a call through the PSTN, the extension/main line call processor 230 routes the call through the PSTN. In the case where the call is supposed to be connected to an extension line, the call is distributed to an extension terminal by a private exchange.

The media gateway 240 processes transcoding between media for call processing. For example, when a call is routed, the media gateway 240 converts a compression algorithm (e.g., G.711A/μ and G.723) according to network types.

FIG. 3 is a block diagram illustrating the detailed construction of the traffic manager of the IP converged system according to the invention.

The traffic manager 220 includes the classifier 221, the marker 222, the buffer manager 223 and the queue scheduler 224.

The classifier 221 sorts received packets according to classes. For example, the classifier 221 can set each class into a VoIP voice packet, VoIP fax packet and a Real-Time (RT) streaming packet. The classifier 221 also transmits the packets, which are sorted according to the classes, to the marker 222.

The marker 222 sets packet drop precedence by marking IP precedence or a Differentiated Services Code Point (DSCP) on packets sorted according to classes. Here, the marker 222 most frequently uses a method of identifying traffic with the DSCP.

The buffer manager 223 drops a packet or allows the packet to pass through according to data traffic-processing state.

The state of the buffer manager 223 is determined to be busy or idle. The term "busy" refers to a state in which the number of packets on a network excessively increases beyond the packet processing capability of the network. The term "idle" refers to a state which is not busy and in which incoming packets are being received at an amount that can be processed by the network.

In addition, the buffer manager 223 uses the WRED algorithm to control network congestion. The WRED algorithm is designed to randomly drop packets before congestion occurs. Thus, the buffer manager 223 begins to drop some packets even if the network is not busy yet.

Even if some packets are dropped according to the WRED algorithm before being busy, the network becomes busy when it is overcrowded with packets. In this case, the VoIP call processor 210 reroutes a call through the PSTN. For this, the buffer manager 223 interworks with the VoIP call processor 210 to provide information on the data traffic-processing state of the buffer manager 223. Accordingly, the present invention ensures the QoS of a call by routing the call according to the data traffic-processing state (busy/idle).

The queue scheduler 224 causes packets to stand by on a queue and forwards the packets according to a predetermined scheduling rule. Here, the queue scheduler 224 can ensure QoS by setting forwarding precedence according to traffic.

Figure 4A:
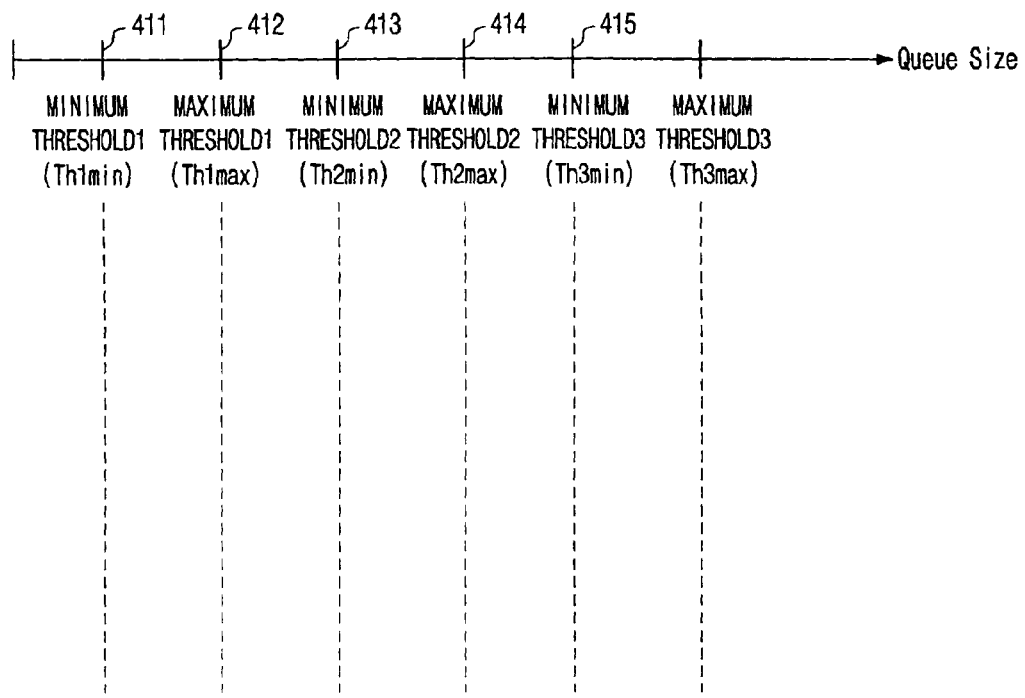
FIG. 4A is a representation illustrating minimum and maximum thresholds, each of which is set to a corresponding class using a WRED algorithm.
Figure 4B:
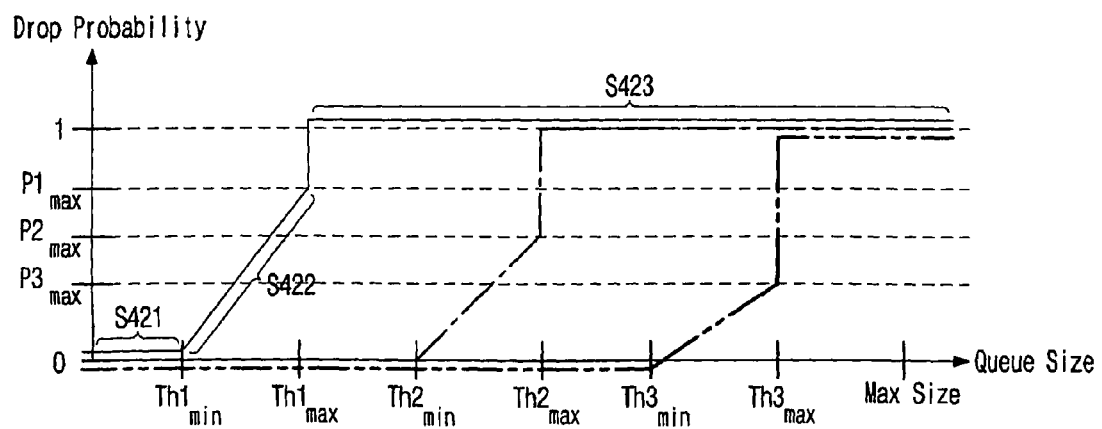
FIG. 4B is a graph illustrating packet drop probabilities according to the thresholds set in FIG. 4A.

FIG. 4A is a representation illustrating minimum and maximum thresholds, each of which is set to a corresponding class using a WRED algorithm, and FIG. 4B is a graph illustrating packet drop probabilities according to the thresholds set in FIG. 4A.

The buffer manager 223 manages data traffic using the WRED algorithm. Here, the buffer manager 223 processing various types of traffic sets drop precedence to be different according to traffic. Herein, the drop precedence set to be different according to traffic is referred to as "drop precedence level".

The drop precedence level is composed of a minimum threshold $Th_{min}$, a maximum threshold $Th_{max}$ and a maximum drop probability $P_{max}$. Herein, the minimum threshold $Th_{min}$, the maximum threshold $Th_{max}$ and the maximum drop probability $P_{max}$ are set to be different according to classes of traffic. For this, the WRED algorithm sets a plurality of values of $Th_{min}$, $Th_{max}$ and $P_{max}$ in one queue. In FIG. 4A, it is assumed that three values of $Th_{min}$, $Th_{max}$ and $P_{max}$ are set in one queue. In this case, a difference in the drop precedence level causes a difference in the start time point of packet dropping and the degree of the packet dropping.

The buffer manager 223 sets drop precedence according to traffic and, particularly, sets a higher value of drop precedence to a more important packet (i.e., a packet that should not be dropped). In the case of a class having low drop precedence (e.g., Drop Precedence Level 1), the minimum threshold is set to a lower value so that packet dropping starts early. In contrast, in the case of a class having high drop precedence (e.g., Drop Precedence Level 3), the minimum threshold is set to a higher value so that packet dropping starts later.

For example, a class is assumed to be composed of a VoIP fax data packet, an RT streaming packet and a VoIP voice data packet.

When the VoIP voice data packet is damaged, QoS greatly decreases. A VoIP call is more sensitive to packet loss than a different class of traffic is. Thus, in case of the VoIP voice data packet, drop precedence is set to the highest value. The buffer manager 223 assigns Drop Precedence Level 3 to the VoIP voice data packet.

A real-time data service is required to be provided without delay or interruption in terms of characteristics of the service, but is less sensitive to packet loss than the VoIP voice data packet is. Thus, the buffer manager 223 assigns Drop Precedence Level 2 to the RT streaming packet.

The VoIP fax data packet is one type of non-real-time data that is not sensitive to delay or loss. Thus, the buffer manager 223 assigns Drop Precedence Level 1 to the VoIP fax data packet.

In the WRED, even a high precedence packet can be dropped but will be dropped at a later time point. To compensate for this drawback, the buffer manager 223 minimizes packet loss due to packet dropping by greatly increasing the minimum threshold.

A result of setting drop precedence like this is shown in FIG. 4A. Referring to FIG. 4A, it can be appreciated that minimum threshold 3 (415) of Drop Precedence Level 3 is greater than minimum threshold 1 (411) of Drop Precedence Level 1. That is, a class having higher drop precedence is set to a higher minimum threshold. This indicates that a corresponding packet starts to be dropped later than others.

While FIG. 4A illustrates that the maximum threshold 1 (412) of lower drop precedence (i.e., Drop Precedence Level 1) is set to be lower than minimum threshold 2 (413) of higher drop precedence (i.e., Drop Precedence Level 2), maximum threshold 2 (414) of lower drop precedence (i.e., Drop Precedence Level 2) can be set to be the same as or higher than minimum threshold 3 (415) of higher drop precedence (i.e., Drop Precedence Level 3).

FIG. 4B is a graph illustrating packet drop probabilities according to the thresholds set in FIG. 4A.

The buffer manager 223 drops incoming packets in a step-wise sequence based on drop precedence levels assigned according to traffic. For example, VoIP fax data packets assigned with Drop Precedence Level 1 will be dropped as follows:

In a section where queue size is smaller than the minimum threshold 1 (411), no packet is dropped and thus packet drop probability is 0 (S421).

In a section where the queue size exceeds the minimum threshold 1 (411), a class of packets set to Drop Precedence Level 1 begin to be randomly dropped. Then, packet drop probability continues to increase until it reaches maximum packet drop probability $P1_{max}$ (S422). When the queue size becomes the same as the maximum threshold 1 (412), the packet drop probability is equal to the maximum packet drop probability $P1_{max}$.

When queue size begins to exceed the maximum threshold 1 (412), all incoming packets are dropped. After that, packet drop probability continues to be 1 (S423).

In contrast, packets set to Drop Precedence Level 2 or Drop Precedence Level 3 start to be dropped at a later time point than a class of packets set to Drop Precedence Level 1. In addition, the packets set to Drop Precedence Level 2 or Drop Precedence Level 3 have maximum drop probability $P2_{max}$ or $P3_{max}$ that is lower than the maximum packet drop probability $P1_{max}$ of the packet class set to Drop Precedence Level 1. This indicates that the class of packets set to low drop precedence are more aggressively dropped but the class of packets set to higher drop precedence are less dropped. Accordingly, the packets can be efficiently processed according to data traffic characteristics.

FIG. 5 is a ladder diagram illustrating a call-processing process in which a VoIP call processor, a buffer manager and an extension/main line call processor interwork according to the invention.

Since the IP network processes both VoIP data and typical data traffics, the data traffic-processing state of the buffer manager 233 has an effect on the QoS of a VoIP call. Specifically, when the data traffic-processing state is busy, the QoS of the VoIP call degrades. Thus, according to an exemplary embodiment of the present invention, the QoS of the VoIP call is estimated according to the state of the buffer manager 233, and the VoIP call is routed based on the estimation. For this, the VoIP call processor 210 basically routes a call through the IP network but reroutes the call through the PSTN only when the data traffic-processing state of the IP network is busy.

When an incoming call is received, the extension/main line call processor 230 requests a VoIP outgoing call to the VoIP call processor 210 (S501). The VoIP outgoing call refers to a call that is routed through the IP network.

The VoIP call processor 210 checks the data traffic-processing state of the buffer manager 233 (S502). Specifically, the VoIP call processor 210 checks the class-specific WRED state (idle/busy state) on the IP network.

For example, a VoIP voice data packet of Drop Precedence Level 3 shown in FIG. 4B is idle when the queue size is smaller than minimum threshold 3 (415) and is busy when the queue size is greater than minimum threshold 3 (415).

In this case, the VoIP call processor 210 determines whether or not to process a VoIP call according to the data traffic-processing state (S503).

When the data traffic-processing state of the buffer manager 233 is busy, the VoIP call processor 210 reroutes the call through the PSTN (S504). In more detail, the VoIP call processor 210 routes the call to be processed through the extension/mail wire call processor 230, and the extension/main line call processor 230 routes the routed call through the PSTN network so as to process the call as a PSTN call.

In contrast, when the data traffic-processing state of the buffer manager 233 is idle, the VoIP call processor 210 routes the call through the IP network in order to process the call as a VoIP call (S505).

The invention provides the interworking between the VoIP call processor 210 and the buffer manager 233 as described above so as to route calls according to the data traffic-processing state (busy/idle). Conventionally, since the VoIP call processor 210 did not interwork with the buffer manager 233, the call routing was processed irrespective of the data traffic-processing state, which directly has an effect on sound quality, thereby failing to ensure the QoS of sound quality.

Figure 6:
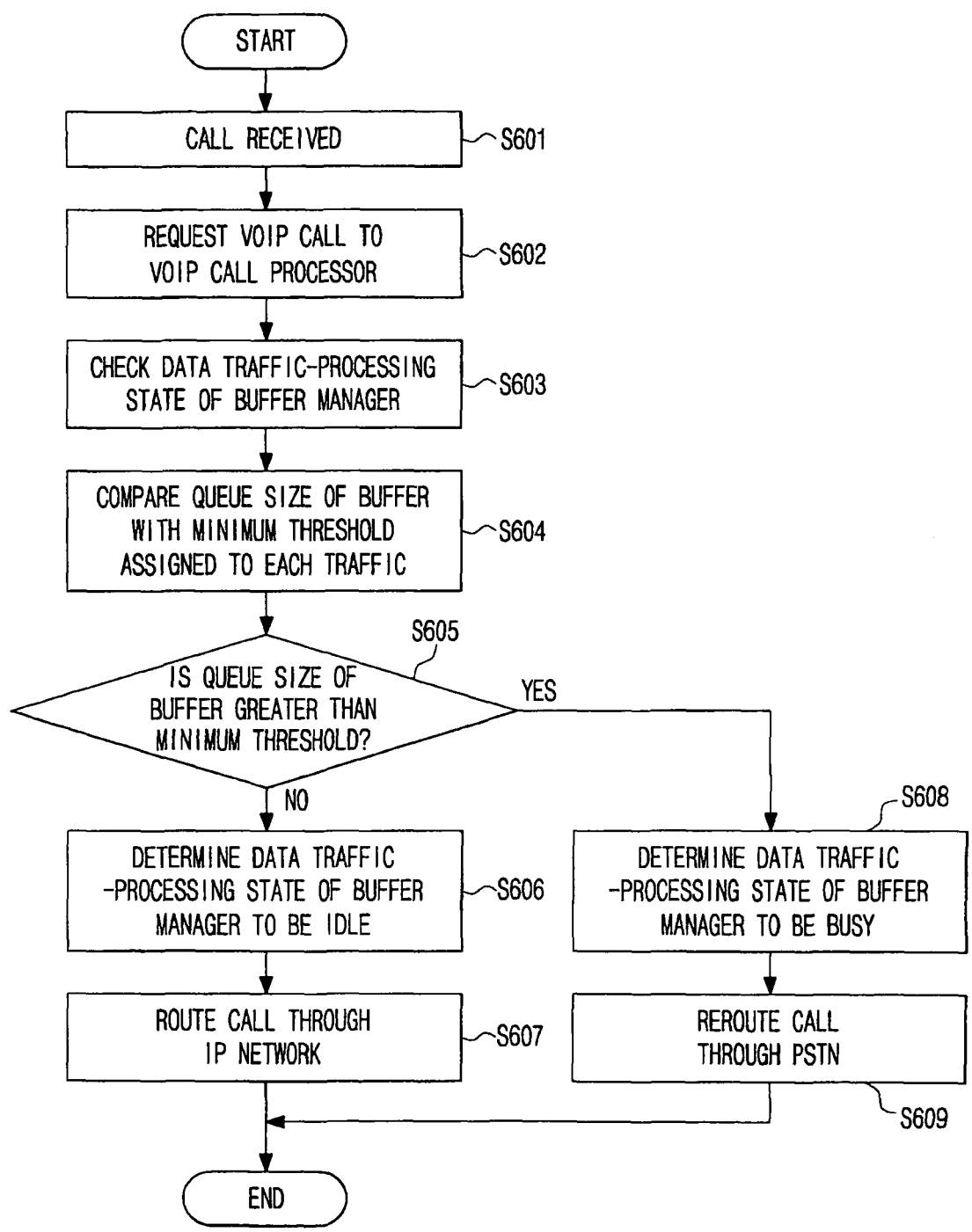
FIG. 6 is a flowchart illustrating a call processing process in an IP converged system according to the invention.

FIG. 6 is a flowchart illustrating a call processing process in an IP converged system according to the invention.

When an incoming call is received in the IP converged system 200 (S601), the extension/main line call processor 230 requests a VoIP outgoing call to the VoIP call processor 210 (S602).

The VoIP call processor 210 checks the data traffic-processing state of the buffer manager 233 in response to the request (S603).

Here, the VoIP call processor 210 compares the queue size of a buffer in the buffer manager 233 with a minimum threshold set to traffic (S604). As discussed hereinbefore, a plurality of minimum thresholds $Th_{min}$, maximum thresholds $Th_{max}$ and maximum drop probabilities $P_{max}$ are set to one queue, and the minimum thresholds are set to be different according to traffic. Thus, it matters which minimum threshold the queue size of the buffer is compared to in the above step S604.

Basically, the minimum threshold of the traffic, which is being currently processed by the buffer manager 233, is compared with the queue size of the buffer. When the buffer manager 233 is processing several traffics, an average of minimum thresholds of the traffics, which are being processed, is calculated and then compared with the queue size of the buffer.

The VoIP call processor 210 determines whether or not the queue size of the buffer is greater than the minimum threshold (S605). When the queue size of the buffer is the same as or smaller than the minimum threshold, the VoIP call processor 210 determines the data traffic-processing state of the buffer manager 233 to be idle (S606). In this case, the VoIP call processor 210 routes the call through the IP network so as to process the call as a VoIP call (S607).

When the queue size of the buffer is greater than the minimum threshold as the result of the step S605, the VoIP call processor 210 determines the data traffic-processing state of the buffer manager 233 to be busy (S608). In this case, the VoIP call processor 210 reroutes the call through the PSTN so as to process the call as a PSTN call (S609).

Accordingly, the entire call processing process in the IP converged system of the invention is completed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An Internet Protocol (IP) converged system comprising:
    a traffic manager configured to interwork with a Voice over Internet Protocol (VoIP) call processor and process data traffic by allowing a packet to pass through or dropping the packet; and
    the VoIP call processor configured to compare a queue size of a buffer in the traffic manager with an average minimum threshold, and route an incoming call through an IP network or reroute the incoming call through a Public Switched Telephone Network (PSTN) based on the queue size of the buffer in comparison to the average minimum threshold,
    wherein the average minimum threshold is calculated as an average of a plurality of minimum thresholds, each minimum threshold set according to a class of the data traffic.

2. The IP converged system according to claim 1, wherein the traffic manager is configured to process data traffic according to a Weighted Random Early Drop (WRED) algorithm.

3. The IP converged system according to claim 2, wherein the traffic manager is configured to set the each minimum threshold, a maximum threshold and maximum packet drop probability to be different according to the class of the data traffic.

4. The IP converged system according to claim 3, wherein the VoIP call processor is configured to determine a data traffic-processing state to be busy when the queue size of the buffer is greater than the average minimum threshold and idle when the queue size of the buffer is equal to or smaller than the average minimum threshold.

5. The IP converged system according to claim 4, wherein the VoIP call processor is configured to reroute the incoming call through the Public Switched Telephone Network when the data traffic-processing state is busy.

6. The IP converged system according to claim 4, wherein the VoIP call processor is configured to route the incoming call through the IP network when the data traffic-processing state is idle.

7. The IP converged system according to claim 1, further comprising:
    an extension or main line call processor configured to route the call through the Public Switched Telephone Network when the VoIP call processor reroutes the call through the Public Switched Telephone Network; and
    a media gateway configured to process transcoding between media for processing the call.

8. A call processing method in an Internet Protocol (IP) converged system, comprising:
    requesting an incoming call be routed through an IP network;
    comparing a queue size of a buffer in a traffic manager with an average minimum threshold, in response to the request; and
    routing the incoming call through the IP network or routing the incoming call through a Public Switched Telephone Network (PSTN) based on the queue size of the buffer in comparison to the average minimum threshold,
    wherein the average minimum threshold is calculated as an average of a plurality of minimum thresholds, each minimum threshold set according to a class of the data traffic.

9. The call processing method according to claim 8, wherein the data traffic is processed using a Weighted Random Early Drop (WRED) algorithm.

10. The call processing method according to claim 9, wherein a drop precedence level is set for the data traffic by setting the each minimum threshold, a maximum threshold and a packet drop probability to be different according to the class of the data traffic.

11. The call processing method according to claim 10, wherein a lower precedence packet is set with a lower drop precedence so as to be dropped earlier, and a higher precedence packet is set with a higher drop precedence so as to be dropped later.

12. The call processing method according to claim 10, wherein a data traffic-processing state is determined to be busy when the queue size of the buffer is greater than the average minimum threshold and idle when the queue size of the buffer is equal to or smaller than the average minimum threshold.

13. The call processing method according to claim 12, wherein the incoming call is rerouted through the Public Switched Telephone Network when the data traffic-processing state is busy.

14. The call processing method according to claim 12, wherein the incoming call is rerouted through the IP network when the data traffic-processing state is idle.

15. A call processing method in an Internet Protocol (IP) converged system, comprising:
    receiving a request to route a call through an IP network;
    comparing a queue size of a buffer in a traffic manager with an average minimum threshold, in response to the request; and
    routing the call through the IP network or a Public Switched Telephone Network (PSTN) based on the queue size of the buffer in comparison to the average minimum threshold,
    wherein the average minimum threshold is calculated as an average of a plurality of minimum thresholds, each minimum threshold set according to a class of the data traffic.

16. The call processing method according to claim 15, wherein data traffic is processed using a Weighted Random Early Drop (WRED) algorithm.

17. The call processing method according to claim 16, wherein a drop precedence level is set for the data traffic by setting the each minimum threshold, a maximum threshold and a packet drop probability based on the class of the data traffic.

18. The call processing method according to claim 17, wherein a lower precedence packet is set with a lower drop precedence so as to be dropped earlier, and a higher precedence packet is set with a higher drop precedence so as to be dropped later.

19. The call processing method according to claim 17, wherein a data traffic-processing state is determined to be busy when the queue size of the buffer is greater than the average minimum threshold and idle when the queue size of the buffer is equal to or smaller than the average minimum threshold.

20. The call processing method according to claim 19, wherein the call is rerouted through the Public Switched Telephone Network when the data traffic-processing state is busy, and the call is rerouted through the IP network when the data traffic-processing state is idle.

* * * * *